/

US009872133B1

(12) United States Patent
Mittal

(10) Patent No.: US 9,872,133 B1
(45) Date of Patent: Jan. 16, 2018

(54) WIRED WEARABLE AUDIO VIDEO TO WIRELESS AUDIO VIDEO BRIDGING DEVICE

(71) Applicant: Millind Mittal, Saratoga, CA (US)

(72) Inventor: Millind Mittal, Saratoga, CA (US)

( * ) Notice: Subject to any disclaimer, the term of this patent is extended or adjusted under 35 U.S.C. 154(b) by 0 days.

(21) Appl. No.: 15/405,300

(22) Filed: Jan. 12, 2017

(51) Int. Cl.
*H04W 4/00* (2009.01)
*H04R 1/10* (2006.01)

(52) U.S. Cl.
CPC .......... *H04W 4/008* (2013.01); *H04R 1/1091* (2013.01); *H04R 2420/07* (2013.01)

(58) Field of Classification Search
CPC .................................................... H04W 4/008
USPC .................. 455/557, 550.1, 73, 575.1, 90.3, 455/41.1–41.3, 569.1, 100, 422.1, 403, 455/426.1, 426.2; 381/309, 370, 311, 381/374, 381, 367
See application file for complete search history.

(56) References Cited

U.S. PATENT DOCUMENTS

| | | | | |
|---|---|---|---|---|
| 2006/0046656 | A1* | 3/2006 | Yang | H04M 1/6066 455/41.3 |
| 2009/0279722 | A1* | 11/2009 | Lin | H04R 5/04 381/311 |
| 2012/0033142 | A1* | 2/2012 | Thomson | G02B 7/002 348/838 |
| 2016/0080851 | A1* | 3/2016 | Sumsion | H04B 1/086 381/74 |
| 2016/0112611 | A1* | 4/2016 | Isaac-Lowry | H04N 5/2251 348/207.1 |

FOREIGN PATENT DOCUMENTS

JP 2015139215 A * 7/2015 ............ H04W 4/008

* cited by examiner

*Primary Examiner* — Keith Ferguson
(74) *Attorney, Agent, or Firm* — Stephen E. Zweig

(57) ABSTRACT

An adapter or bridging device that provides both a wired audio or audio and video female jack connectors for wired devices such as wired earphones, headphones and wired video headsets; as well as a wireless link to nearby handheld computerized devices such as mobile phones (e.g. smartphones). The device may be configured to be clipped to the user's clothing, as well as to interface with pairing control devices to easily form Bluetooth, WiFi, or other type wireless links. The device may also include at least one computer processor to manage the wireless link, control the attached wired headphones or video headsets, as well as perform compression and decompression functions as desired.

10 Claims, 6 Drawing Sheets

WIRED WEARABLE AUDIO VIDEO TO WIRELESS AUDIO VIDEO BRIDGING DEVICE

CROSS REFERENCE TO RELATED APPLICATIONS

Background of the Invention

Field of the Invention

This invention is the field of wireless audio earphones, video glasses and headset and wireless audio video converters.

Description of the Related Art

With the prevalent of use of mobile phones (e.g. Smartphones) and other portable handheld computerized devices such as tablet computers, there has been demand and interest in audio earphones to allow users to hear audio output better. At present, there are two main types of audio earphones. A first type uses wired analog or digital connections (often using miniature or sub-miniature headphone jacks, as well as proprietary jacks such as the Apple Lighting jack, and the like). Note the earphone, headphone jacks are also referred as plug and jack connectors. A second type uses wireless connections, often based on the popular Bluetooth® IEEE 802.15 type wireless technology.

Prior art wired audio earphones, such as earbud type earphones with speakers in the earbuds and a microphone on the connected wire to capture the audio, have certain benefits, such as low weight, often no need for batteries, and often high portability. These devices are often easily carried in the user's pocket, and can be inconspicuously worn when in use. When the need for the earphone is finished, the earphone can removed and stored for later use.

Wireless audio earphones come in both single ear and dual ear configurations, often with an attached microphone, and both can use Bluetooth or other type wireless protocol to connect to the mobile phone or other handheld computerized device. One drawback of present single ear wireless earphones, however, is that 1) the immersive audio experience is missing; 2) the devices tend to be somewhat bulky (due to space required by the wireless chips, antenna, and battery). An additional problem is that any microphone included with the device tends to positioned away from the mouth and closer to the ear. Such devices often look less pleasing from a visual perspective. For example, a person talking with a small audio earphone on one ear often looks as if he or she were talking to themselves.

Although dual earphone wireless devices can offer a more immersive audio experience, the devices have not achieved much popularity in the marketplace. Thus further improvements in earphone technology would be desirable.

BRIEF SUMMARY OF THE INVENTION

The invention is based, in part, on the insight that prior art wired audio earphones have a suboptimal design. Typically one of the wired audio earphone's wires needs to be long enough so that it can be connected by the jack to a smartphone in the user's pocket on one end, while still allowing the earphone to be worn in the user's ear on the other end. This requires a length of at least several feet, which is long enough that this wire can easily become tangled.

Another problem is that such wired audio earphones of course require a corresponding female headphone jack audio connector (also referred to just by female jack) on the mobile phone. This takes up valuable mobile phone real estate.

The invention is also based, in part, on the insight that an improved type of earphone would be both small and lightweight, yet not require a long connecting wire to attach to a smartphone. This requires a new type of "bridging device", however.

Thus in some embodiments, the invention may be a clip-on bridging device that provides both an audio female jack or connector to support wired earphone jacks, as well as a wireless (e.g. Bluetooth, WiFi) interface to wirelessly connect with mobile phones and other handheld computerized devices via a wireless link.

In another embodiment of the invention, useful for augmented reality and virtual reality applications, this clip-on bridging device (bridging device is also interchangeably referred to as bridge device) may provide both audio and video female jack (connectors) to support wired earphone and/or video display and capture glasses or headsets with a jack connector—here on wired earphone and/or video display and capture glasses or headsets with a jack connector is referred to as wired wearable IO devices—; and bridge these wired wearable IO devices to the user's mobile phone or handheld computerized device using a wireless (e.g. Bluetooth, WiFi) link.

Such a clip-on bridge device could either be used with prior art wired earphones and other devices with longer connecting cables, or alternatively, if clipped on the user's shirt closer to the user's neck, would enable wired headphones and video headsets with shorter connecting wires/cables.

DETAILED DESCRIPTION OF THE INVENTION

Figure 1:
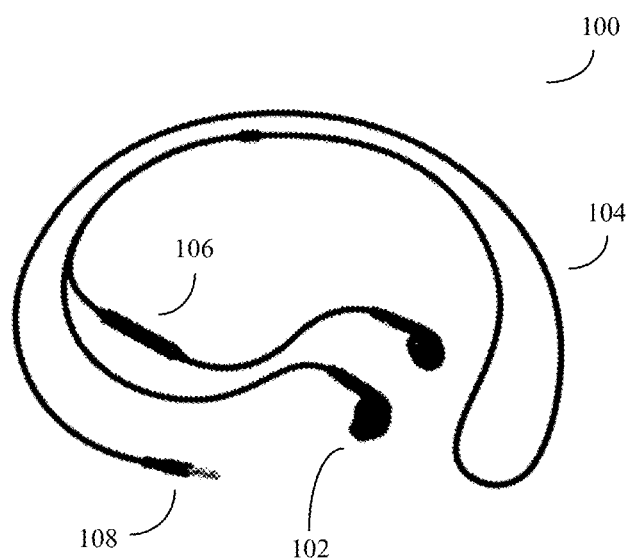
FIG. 1 shows a prior art wired earphone device configured with earphones for two ears.

As previously discussed, according to the invention, this wired-audio-earphone (and/or video display glass or headset)-to-wireless interface "bridging device" (e.g. a device to bridge wired wearable IO device input-output interfaces, to the audio and video input-output of mobile phones or other handheld computerized devices) combines some of the best features of the wired and wireless worlds.

The invention's bridging device can be easily clipped to the user's clothing (e.g. shirt or belt). In some embodiments, the device may also provide an external pairing control switch in the form of a button (referred to as a "pairing button"). Such an external pairing button can allow the user to easily pair (e.g. make a Bluetooth or WiFi wireless connection) between the user's mobile phone and the bridging device by simply pressing the pairing control device, and accepting the connection request on the mobile phone to which this device is to be paired.

Although in this disclosure, earphone and video display glasses or headsets are used as a specific example of the devices that may connect with the present invention, these examples are not intended to be limiting. In other embodiments, other types of audio and video output device that are worn by a user may also be connected to the bridging device as well. Additionally the bridge device may also be used to interface to video capture glasses or headsets.

Due to the limited bandwidth of some wireless connections, such as Bluetooth connections, in some embodiments it may be useful to configure the mobile phone to output audio/video data in a compressed form, and to equip the bridging device with suitable processors (e.g. microprocessors, microcontrollers, digital signal processors) that can decompress this compressed audio or video signal.

In some embodiments, in order to allow use of lower bandwidth devices, instead of decompressing the video and/or audio fully for video and/or audio output from a mobile phone (or compressing video and/or audio fully for video and/or audio input to mobile phone), the system may be configured to only perform a subset of the overall decompression (or compression) flow in the bridging device. The rest of the decompression (or compression) steps may be left to be done in the wired wearable IO device.

For example, in some embodiments, for the case of video interface output from the mobile phone, only Intra-frame compression frames (I-frames) may be decompressed in the bridging device and Prediction (P-frames) and Bi-direction Prediction (B frames) processing may be left to be done in the wired wearable IO device. In this embodiment, there is increase in increased bandwidth communication between the bridging device and the wired wearable IO device, which is reasonable for carrying over wired interface. However by not doing the full decompression process avoids carrying fully decompressed information over the wire between the bridging device and the wired wearable IO device. This helps minimize bandwidth, and the overhead associated with carrying higher bandwidth signals, such as use of more expensive and bulkier cables and the like.

In an alternative embodiment, the bridging device may fully decompress the video transmitted from the mobile phone over the wireless interface to bridging device, and then transmit the signals to the wired wearable IO device as an analog form or fully decompressed digital stream.

In another embodiment, the video stream received over wireless interface may be only partially de-compressed, and then further decompressed in the wired wearable IO device.

In another embodiment, the audio and/or video may be compressed with a first compression algorithm, and the bridging device may fully decompress the received audio or video on the wireless interface according to a first decompression scheme, such as MPEG2. The bridging device may then compress this decompressed audio and/or video data according to a second (different) compression scheme, such as MPEG4, and send the audio-video stream to a wired wearable IO device compressed with a this different compression scheme. This can be useful, because the different compression scheme may be chosen to be less computationally intensive to decompress. This would thus reduce the computational and power requirements at the wired wearable IO device along, with allowing use of a less expensive or less bulky lower bandwidth wire to connect the wired wearable IO device and the bridge device (relative to if just the first compression and decompression scheme had been used.

Similarly, for the case when a wired wearable IO device is used for capturing video and audio, the bridging device may use a compression scheme that is lighter on computation and/or power requirements, and transmit this lightly compressed or uncompressed data to the bridge device. The bridge device then may utilize a compression scheme that is more demanding on computation (and/or power), but which leads to a higher degree of compression. This scheme would thus reduce the communication bandwidth for wireless communication between the bridge device and the mobile phone.

Although in most of the examples discussed herein, the bridging device is shown using wireless methods to connect to mobile phones and portable tablet, these examples are not intended to be limiting. In other embodiments, the bridging device may also be also used to connect to other types of audio video capable systems or devices.

In some embodiments, when wired wearable IO bridging device contains digital or analog electronics, the wire connecting to the bridge device may also double as the wire for carrying electrical power to the electronics in the wearable IO device.

FIG. 1 shows a prior art wired earphone device (100) configured with earbud style earphones (102) for two ears. This device also has a several foot long connecting wire (104), optional microphone (106), and an audio jack (108) such as a miniature or sub-miniature headphone jack (108).

Figure 2:
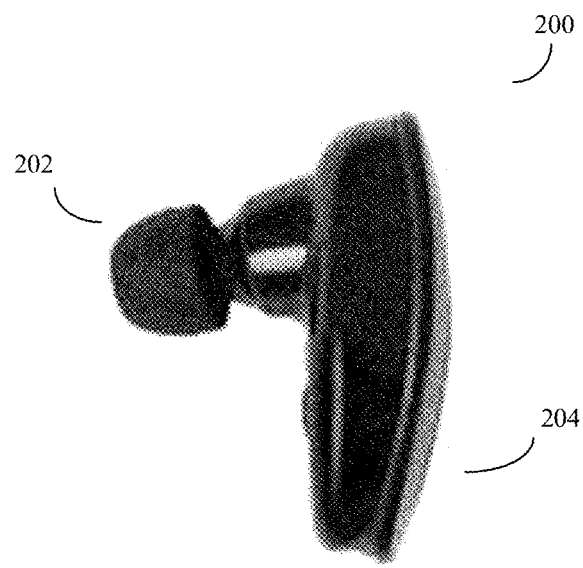
FIG. 2 shows a prior art single ear wireless earphone device.

FIG. 2 shows a prior art single ear wireless (100) earphone device (200). This device has a single earbud style earphone (202), and a case (204) that houses the device's wireless (e.g. Bluetooth) circuitry, optional microphone, and battery.

Figure 3:
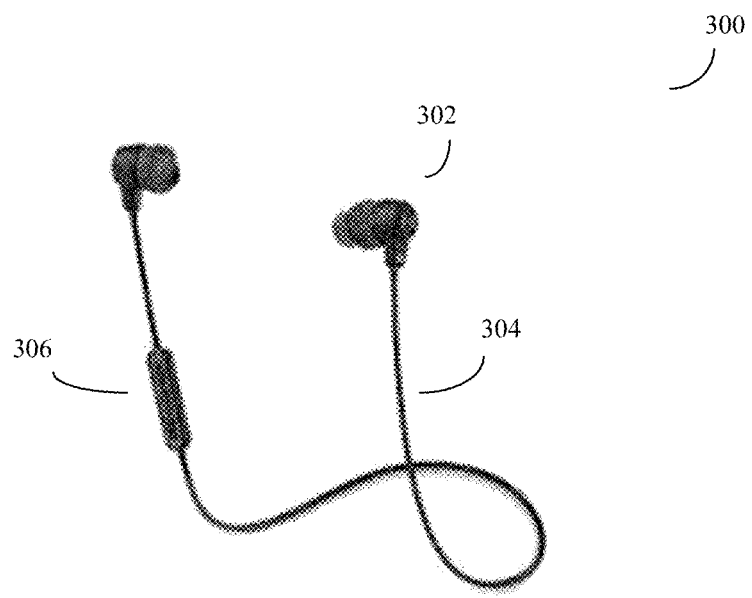
FIG. 3 shows a prior art wireless earphone configured for two ears.

FIG. 3—shows a prior art wireless earphone device configured for two ears (300). This device has two earbud style earphones (302), a short (often only about 1 foot long) wire (304) to connect the two earphones, and a case (306) housing the wireless (e.g. Bluetooth) circuitry, battery, and optional microphone.

Figure 4:
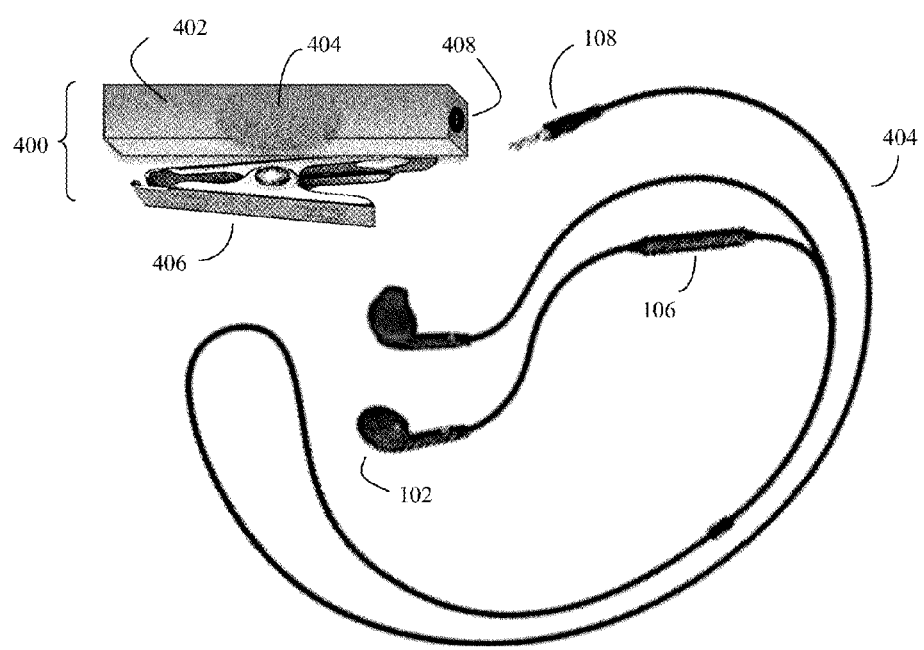
FIG. 4 shows a hybrid wired/wireless earphone device working with the invention's bridge device

FIG. 4 shows the invention's wired earphone to wireless bridge device (400). This invention comprises a small case (402) holding the device's circuitry (shown in more detail in FIGS. 5 and 6), an optional pairing button (404), connectors (such as female connectors) for wired audio or video input jacks, (408) (these are also referred to as "female jacks"). The invention may also comprise an optional clip (406) configured to attach the device to the user's clothing.

FIG. 4 also shows how this device can interface with a wired earphone (also referred to as headphone) such as the a wired earphone an audio jack (108), earbuds style earphones (102), optional microphone (106) and a connecting wire (404), which can in some embodiments be considerably shorter than the connecting wire (104) previously shown in FIG. 1.

Figure 5:
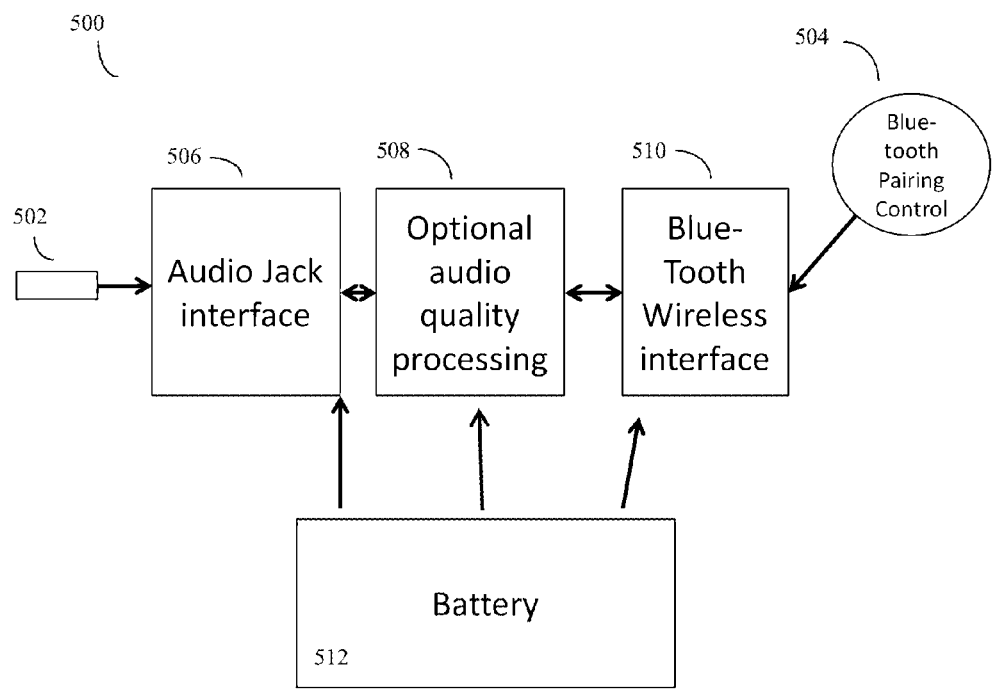
FIG. 5 shows a block diagram of the various components of the invention's bridge device

FIG. 5 shows a block diagram (500) of the various components of the invention's wired earphone to wireless bridge device (400). These components can include a wired audio input jack connector (such as a female miniature or sub-miniature headphone jack), wireless pairing control circuitry (504) (e.g. Bluetooth pairing control circuitry) optionally connected to input (404), audio jack interface circuitry (506) (this may include digital to analog (D/A) or analog to digital (A/D) converters as needed), optional audio quality processors (508) (which may be implemented by a computer microprocessor or digital signal processor), the wireless interface circuitry (often Bluetooth or WiFi) (510) and a battery (512).

Thus in some embodiments, the invention may be a wired earphone to wireless bridge device (400), comprising an audio jack interface (502), a wireless transceiver (510) that provides a wireless communication interface for communication supported by mobile phones (e.g. smartphones, such as the popular iPhone or Android series) or other handheld computerized devices (e.g. iOS, Windows, Chrome, Android devices). In a preferred embodiment, this device may also be configured to support a pairing control circuit (504) that allows wireless pairing of the device (404) to a mobile phone to establish a wireless communication link. In some embodiments, the device (400) may further comprise a clip (406) configured to allow the device to be clipped onto the user's clothing.

As previously discussed, the device (400) may use various types of wireless transceivers, typically short range low power wireless transceivers (510) using protocols such as Bluetooth, WiFi, ZigBee, or similar type wireless protocol. The device's audio jack interface (502) can be configured to support either analog or digital operation, and be compatible with wired analog style earphones or, via a digital jack (e.g. such as an Apple Lightening jack), digital headphones. The device (400) will often be configured with at least one processor to help implement the above functionality, and may also comprise a battery (512) as well.

In some embodiments, the invention (400) may also be configured to support video output and input. This type of embodiment can be particularly useful for wired video glasses and headsets, such as video headsets used for virtual reality or augmented reality applications.

Figure 6:
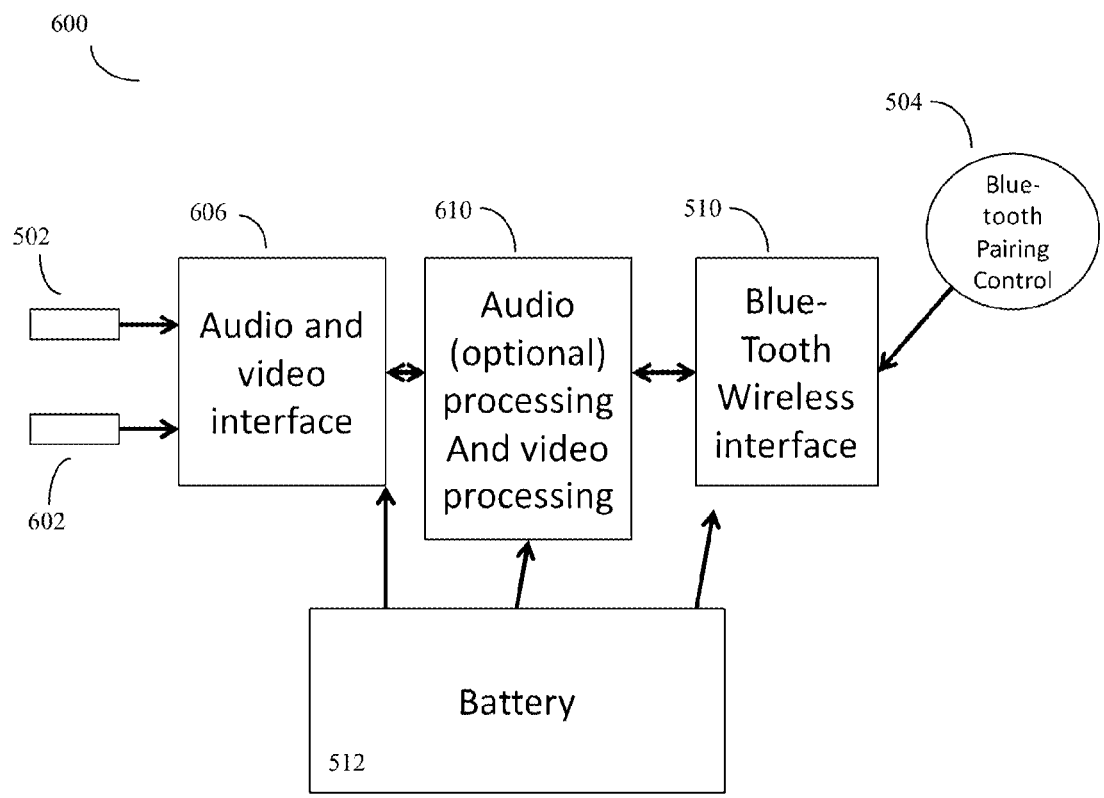
FIG. 6 shows a block diagram of the various components of an embodiment of the invention that supports both audio and video interfaces.

FIG. 6 shows a block diagram of the various components of an embodiment of the invention that supports both audio and video interfaces. This embodiment earlier was referred to as wired wearable IO device to wireless bridge device, or simply the bridge device. In this embodiment, device (400) would additionally be equipped with a video female jack interface or connector (602) (here assume that there may be two corresponding female adapters 408) which can support video interfaces. This same connector (602) may also support audio interface as well (e.g. may be an audio or video type HDMI connector), or alternatively or additionally, an audio connector (502) may also be provided. In this later case, the device would also have a video or audio/video interface (606), and processor or DSP (610) may also be configured to support video processing as well as audio processing.

Thus in this embodiment, the invention (400) may further comprise an optional wired audio input (502) or wired video or audio/video input (602), a video or audio/video interface with supporting circuitry (e.g. A/D or D/A converters 602), optional circuitry, often processor implemented, for video and audio processing (610) (e.g. image decompression), a wireless transceiver and interface (510) configured provide a wireless communication interface for communication supported by mobile phones (e.g. smartphones, such as the popular iPhone or Android series) or other handheld computerized devices (e.g. iOS, Windows, Chrome, Android devices). In a preferred embodiment, this device will also be configured to support pairing control circuits (504) that allow wireless pairing of the device (404) to a mobile phone or other handheld computerized device to establish a wireless communication link. In some embodiments, the device (400) may further comprise a clip (406) configured to allow the device to be clipped onto the user's clothing.

As before, the wireless interface/transceiver (510) can be any of a Bluetooth or WiFi transceiver. The optional wired audio connector/interface (502) can be any of a wired analog or digital audio jack, and the wired video connector/interface (602) can be a serial or parallel analog or digital connector and video interface.

The invention claimed is:

1. A wired earphone to wireless bridge device, comprising:
    an audio signal input and output consisting of at least one female audio jack interface;
    a wireless communication interface for communication supported by mobile phones;
    wherein said device further comprises a clip configured to enable said device to be clipped to clothing of a user of said device;
    wherein said wireless communication interface comprises any of a Bluetooth or WiFi transceiver; and
    wherein said device further comprises a processor configured to receive audio compressed with a first compression scheme, and fully decompresses this received audio according to a first decompression scheme before sending this audio to said at least one female audio jack interface.

2. The device of claim 1, wherein said device is further configured to accept commands from an external control which allows wireless pairing of said device to said mobile phone to establish a wireless communication link.

3. A wired-wearable IO-device-to-wireless bridge device, comprising:
    at least one wired video female jack interface configured to support any of video output and video input;
    a clip configured to enable said device to be clipped to clothing of a user of said device; and
    a wireless communication interface for communication supported by mobile phones;
    wherein said wireless communication interface comprises any of a Bluetooth or WiFi transceiver; and
    wherein said device utilizes a processor configured to handle a video compression scheme on said wireless communication interface that is different than the video compression scheme on said wired video female jack interface.

4. The device of claim 3, wherein said device is further configured to accept commands from a pairing control which allows wireless pairing of said device with said mobile to establish a wireless communication link.

5. The device of claim 4, wherein said device is configured with at least one processor to support said pairing control.

6. The device of claim 3, wherein said device further comprises at least one audio jack interface, and wherein said at least one audio jack interface is any of a wired analog or digital audio female audio jack interface.

7. The device of claim 3, wherein said at least one wired video female jack interface comprises an HDMI connector.

8. The device of claim 3, wherein said device is configured to convert video from an MPEG2 compression scheme to an MPEG4 compression scheme.

9. The device of claim 3, wherein said device is configured convert video according to a different compression scheme chosen to be less computationally intensive to decompress.

10. The device of claim 3, wherein said device is configured to convert video according to a different compression scheme that leads to a higher degree of video compression.

* * * * *